(12) United States Patent
Yin et al.

(10) Patent No.: US 7,631,397 B2
(45) Date of Patent: Dec. 15, 2009

(54) HINGE

(75) Inventors: Te-hung Yin, Tu-Cheng (TW); Shan-yi Yang, Tu-Cheng (TW); Ming-han Lin, Tu-Cheng (TW); Wei-jia Liang, Tu-Cheng (TW); Chih-heng Chien, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 279 days.

(21) Appl. No.: 11/896,777

(22) Filed: Sep. 6, 2007

(65) Prior Publication Data

US 2009/0064461 A1 Mar. 12, 2009

(51) Int. Cl.
*E05D 11/10* (2006.01)

(52) U.S. Cl. .............................. 16/330; 16/303; 16/337; 16/374

(58) Field of Classification Search .................... 16/330, 16/337, 341, 342, 327, 329, 331, 352, 374, 16/376, 377, 334, 54, 303; 379/433.11, 433.12, 379/433.13
See application file for complete search history.

(56) References Cited

U.S. PATENT DOCUMENTS

| | | | | |
|---|---|---|---|---|
| 5,996,132 | A * | 12/1999 | Sorimachi | 16/303 |
| 6,393,624 | B1 * | 5/2002 | Iwashita | 16/54 |
| 6,948,217 | B2 * | 9/2005 | Higano et al. | 16/303 |
| 7,036,186 | B2 * | 5/2006 | Jeong et al. | 16/303 |
| 7,418,279 | B2 * | 8/2008 | Takagi | 16/54 |

* cited by examiner

Primary Examiner—Victor Batson
Assistant Examiner—Jeffrey O'Brien
(74) Attorney, Agent, or Firm—Rosenberg, Klein & Lee

(57) ABSTRACT

A hinge includes a housing. A sliding cam slideably received in the housing defines concave portions and an axial hole. A rotatable cam mating with the sliding cam has a base portion extending downward to form pushing portions disposed in the concave portions. The base portion defines an accommodating hole. A spring is slideably received in the housing. One end of the spring is fixed on the sliding cam and the other end of the spring is fixed at an end of the housing. A shaft received in the housing runs through the axial hole and the spring. An end of the shaft is received in the accommodating hole, and the other end of the shaft passes through the end of the housing. A first stop has a bottom surface whose part extends downward to form a blocking portion, and the rest part of the bottom surface is defined as a revolving platform. A second stop engaging with the rotatable cam has a top surface protruding upward to form a pushing block rotatably disposed on the revolving platform. And a cap rotatably receives the first stop and the second stop.

10 Claims, 6 Drawing Sheets

HINGE

BACKGROUND OF THE INVENTION

1. Field of the Invention

The present invention relates to a hinge, and more particularly to a hinge with a damper assembly for smoothly opening or closing a foldable electronic device, thereby, assuring secure in its use.

2. The Related Art

As the development of modern mobile communication industry, portable electronic devices such as cellular phones, notebook computers and personal digital assistants etc., become more and more popular. Thereinto, many portable electronic devices have a function of displaying images. In order to display images as distinctly as possible, so screens of the portable electronic devices need to be designed as big as possible. But it is not convenient to carry the portable electronic device with a big screen. That is, the required big screen and the required small size of the portable electronic device are contrary. To solve the problem, foldable electronic devices have been developed. Generally, the foldable electronic device has a cover which is usually used as a screen, and a main body which is joined together with the cover by some types of hinge allowing the cover to be unfolded from the main body.

FIG. 1 shows a conventional hinge used in a foldable electronic device which has a cover and a main body. The hinge includes a cylindrical shaft 700. One end of the shaft 700 is received in a rotatable cam 600 and the other end of the shaft 700 extends to pass through a sliding cam 500, a housing 300 and a cap 200, and is located in the cap 200 through using a ring 100. The rotatable cam 600 protrudes downward to form two pushing portions 601 at bilateral sides thereof. The sliding cam 500 defines two concave grooves 501 receiving the pushing portions 601 respectively. A spring 400 is provided to encircle the shaft 700. One end of the spring 400 is fixed on the sliding cam 500, and an opposite end of the spring 400 is mounted on the cap 200 that plugs an end of the housing 300 and extends toward an inner of the housing 300. The spring 400 and the sliding cam 500 are slideably received in the housing 300. If a user would like to open the foldable electronic device, the user shall firstly unfold the cover from the main body to an angle. The force that the user provides pushes the pushing portions 601 to the top of the concave grooves 501. At the same time, the sliding cam 500 is compelled to slide toward the inner of the housing 300, and the spring 400 is compressed. Then, the user stops acting on the foldable electronic device, and the elastic force of the spring 400 drives the foldable electronic device opened fully.

However, the movement that the spring 400 releases elastic force to open the foldable electronic device is quick and the impact is produced between the cover and the main body. In this case, the foldable electronic device is easy to be broken or damaged. Thus, a highly reliable hinge is desired to overcome the disadvantage mentioned above.

SUMMARY OF THE INVENTION

Accordingly, an object of the present invention is to provide a hinge with a damper assembly for smoothly opening or closing a foldable electronic device.

To achieve the object, the hinge includes a housing. A sliding cam defines concave portions on a top surface thereof. The sliding cam defines an axial hole passing therethrough at center. A rotatable cam mating with the sliding cam has a base portion extending downward to form pushing portions. The pushing portions are disposed in the concave portions of the sliding cam respectively. The base portion defines an accommodating hole passing therethrough at center. A spring is slideably received in the housing. One end of the spring is fixed on the sliding cam and the other end of the spring is fixed at an end of the housing. A shaft received in the housing runs through the axial hole of the sliding cam and the spring. An end of the shaft is received in the accommodating hole of the rotatable cam, and the other end of the shaft passes through the end of the housing. A first stop has a bottom surface. A part of the bottom surface extends downward to form a blocking portion, and correspondingly, the rest part of the bottom surface is defined as a revolving platform. A second stop engaging with the rotatable cam at the bottom thereof has a top surface. The top surface protrudes upward to form a pushing block rotatablely disposed on the revolving platform of the first stop. The pushing block moves to a side of the blocking portion of the first stop and is against the blocking portion for driving the first stop rotating. And a cap rotatablely receives the first stop and the second stop.

As described above, the design of the present invention provides the damper assembly constructed of the first stop, the second stop and the cap to restrain the rotation rate of the rotatable cam. Therefore, the foldable electronic device with the hinge can be opened or closed much more securely.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
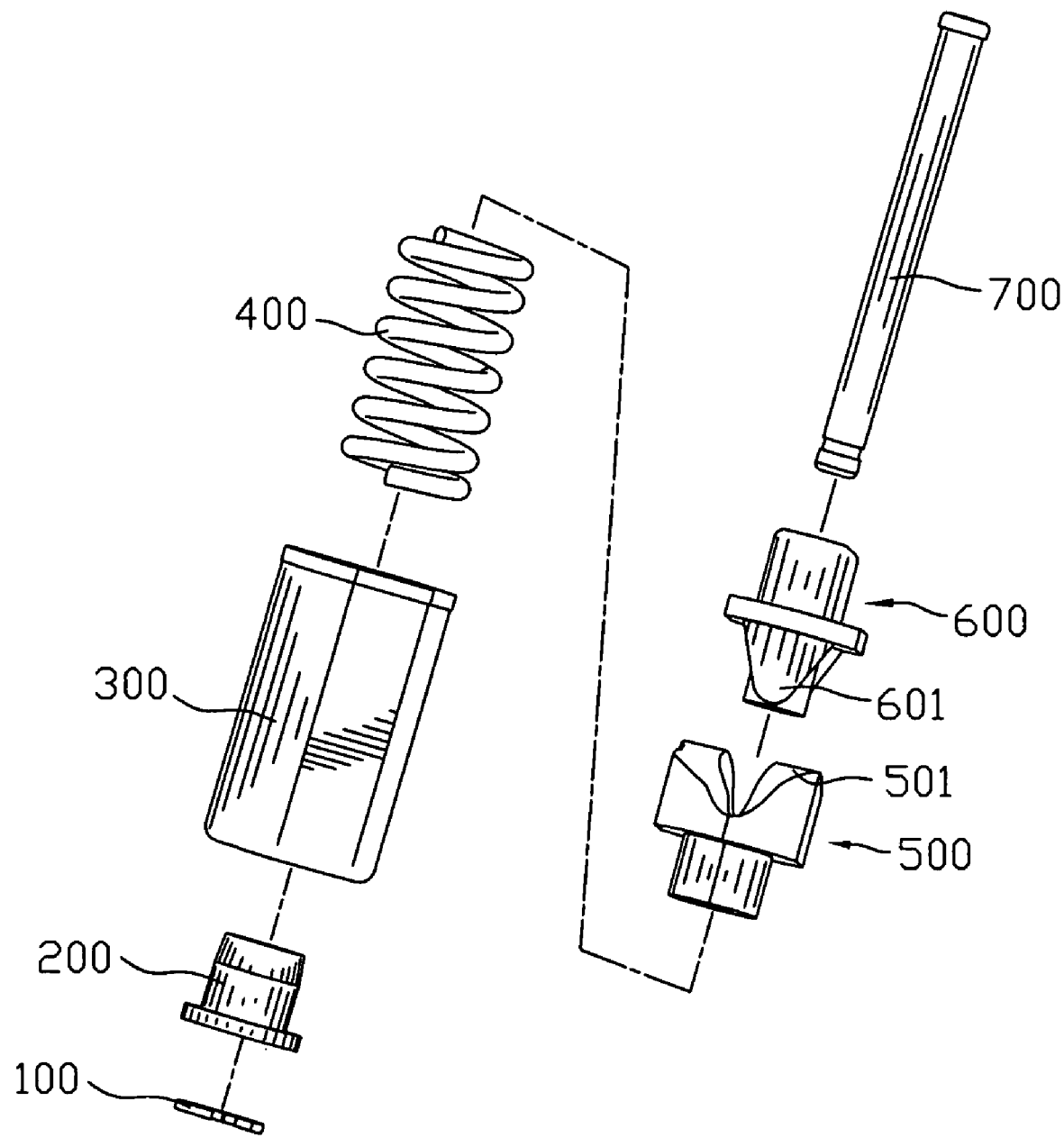
FIG. 1 is an exploded view of a prior hinge.
Figure 2:
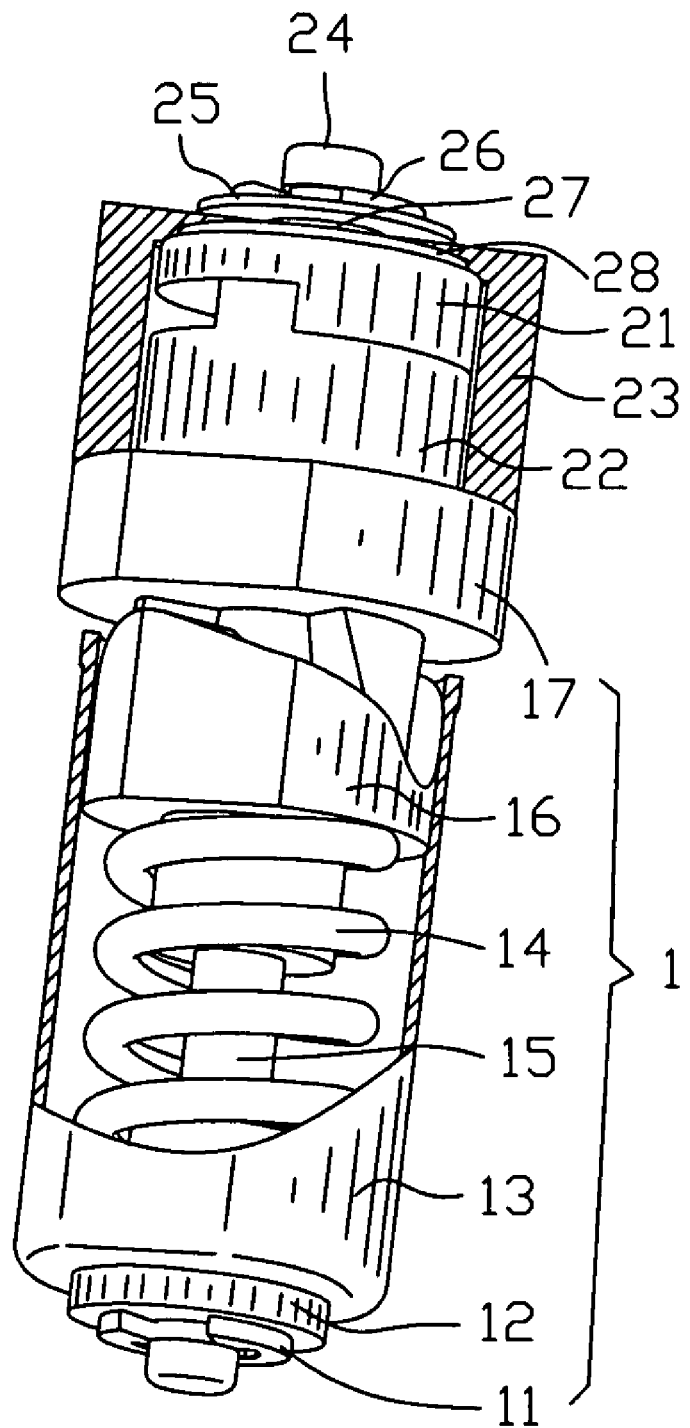
FIG. 2 is a perspective view of a hinge of the present invention which is cut partially for distinctly showing an inner structure thereof.
Figure 3:
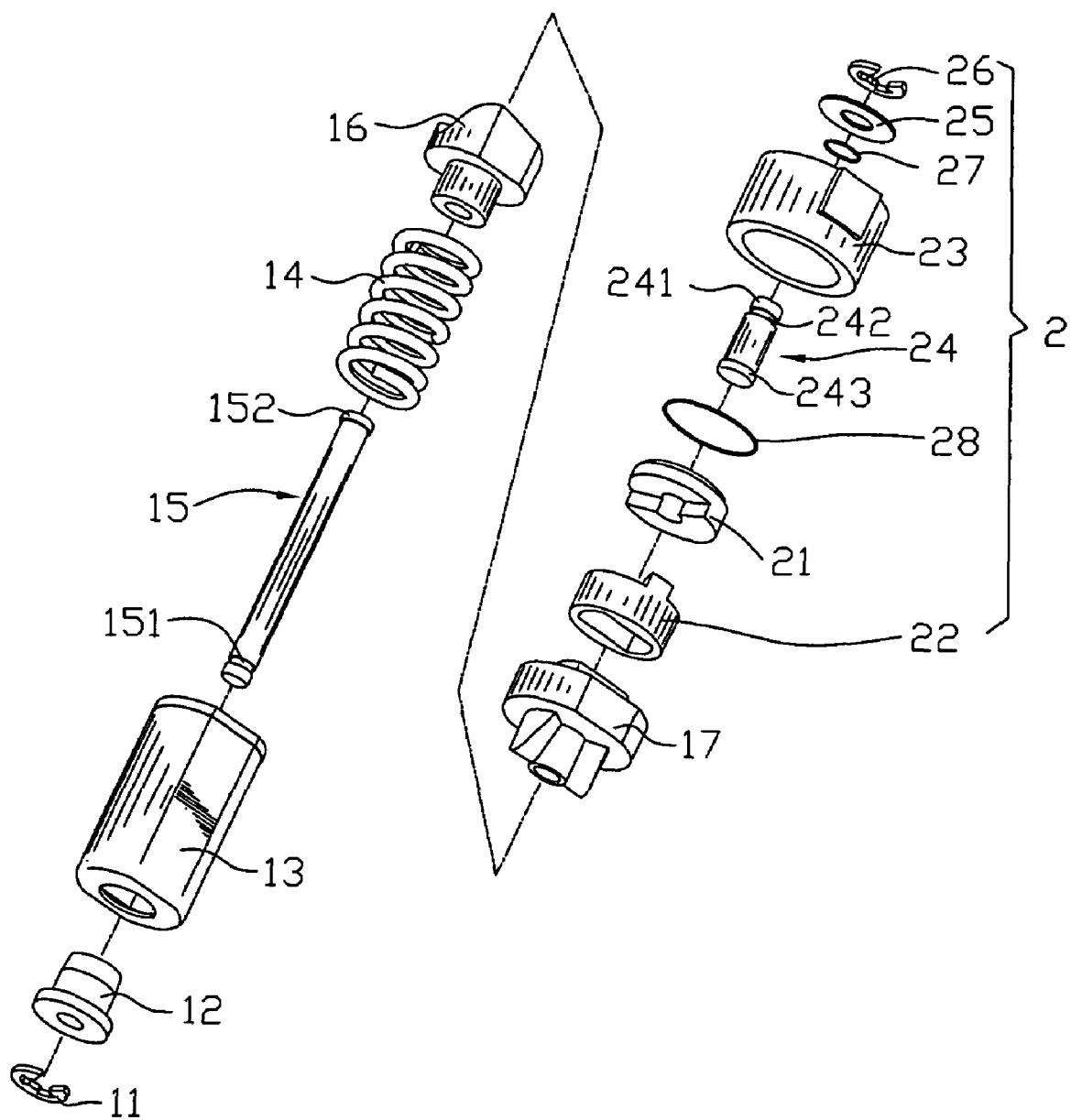
FIG. 3 is an exploded view of the hinge.

Referring to FIG. 2 and FIG. 3, a hinge in accordance with the present invention includes a hinge assembly 1 and a damper assembly 2. The hinge assembly 1 includes a limiting ring 11, a stopple 12, a substantially cylindrical housing 13, a helix-shaped spring 14, a cylindrical shaft 15, a sliding cam 16 and a rotatable cam 17. The damper assembly 2 includes a first stop 21, a second stop 22, a cap 23, a column-shaped rod 24, a washer 25, an e-ring 26 and two circular rings 27, 28. All of these will be described in detail hereinafter.

The housing 13 is hollow and both ends of the housing 13 communicate with the outside. The stopple 12 which defines a through-hole (not labeled) stops one end of the housing 13. The spring 14 and the sliding cam 16 are slideably received in the housing 13. One end of the spring 14 is fastened around the stopple 12 that protrudes into an inner of the housing 13, and an opposite end of the spring 14 is fixed on the sliding cam 16. The shaft 15 runs through the rotatable cam 17, the sliding cam 16, the spring 13 and the through-hole of the stopple 12 in turn. One end of the shaft 15 defines a notch 151 around thereof and projects out of the stopple 12. The limiting ring 11 is provided to locate the shaft 15 on the stopple 12. The limiting ring 11 is substantially E-shaped and defines a gap thereon. The limiting ring 11 is locked in the notch 151 of the shaft 15 and is closely adjacent to an outer surface of the stopple 12. The other end of the shaft 15 protrudes outward around thereof to form a protrusion portion 152. The protrusion portion 152 of the shaft 15 is assembled in the rotatable cam 17 which mates with the sliding cam 16. The sliding cam 16 and the rotatable cam 17 will be described in detail hereinafter.

Figure 10:
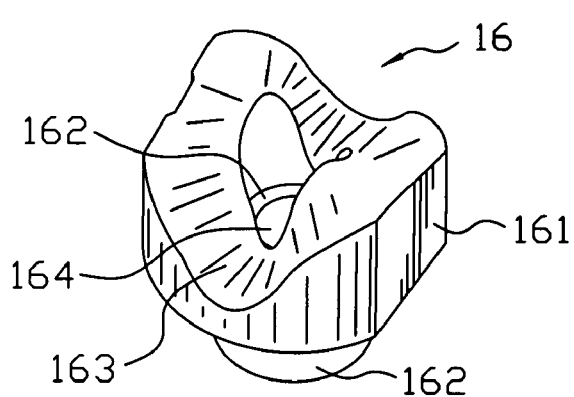
FIG. 10 is a perspective view of a sliding cam of the hinge.

Please refer to FIG. 10 in accordance with FIG. 2. The sliding cam 16 slideably received in the housing 13 has a substantially cylindrical accepting portion 161 that defines two concave portions 163 on a top surface thereof. The two concave portions 163 are substantially V-shaped and defined opposite to each other. Each of the concave portions 163 has an ascending curved surface and a descendent curved surface which is relative to the ascending curved surface. The accepting portion 161 defines an axial hole 164 passing therethrough at center. A hollow column-shaped supporting portion 162 extends downward and attaches to an inner surface of the axial hole 164. The supporting portion 162 has the same axle center as the axial hole 164.

Figure 9:
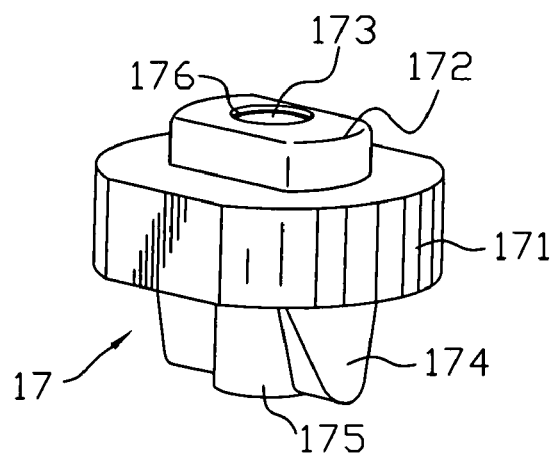
FIG. 9 is a perspective view of a rotatable cam of the hinge.

Please refer to FIG. 9 in accordance with FIG. 2 and FIG. 10. The rotatable cam 17 has a substantially column-shaped base portion 171. The bottom of the base portion 171 projects downward to form a column-shaped rotatable pillar 175 at center. A radius of the rotatable pillar 175 is less than a radius of the base portion 171. Two pushing portions 174 extend downward from the bottom of the base portion 171 and adjoin a peripheral wall of the rotatable pillar 175. The two pushing portions 174 are designed in substantial V-shape and distributed opposite to each other. A top surface of the base portion 171 protrudes upward to form a mating portion 172. The mating portion 172 defines an accommodating hole 173 at center. The accommodating hole 173 passes through the base portion 171 and the rotatable pillar 175. An inner surface of the accommodating hole 173 defines a locking recess 176. The rotatable pillar 175 is received in the axial hole 164 of the sliding cam 16 and held by the supporting portion 162. The two pushing portions 174 are disposed in the two concave portions 163 respectively. The accommodating hole 173 receives the shaft 15 with the protrusion portion 152 located in the locking recess 176.

Figure 6:
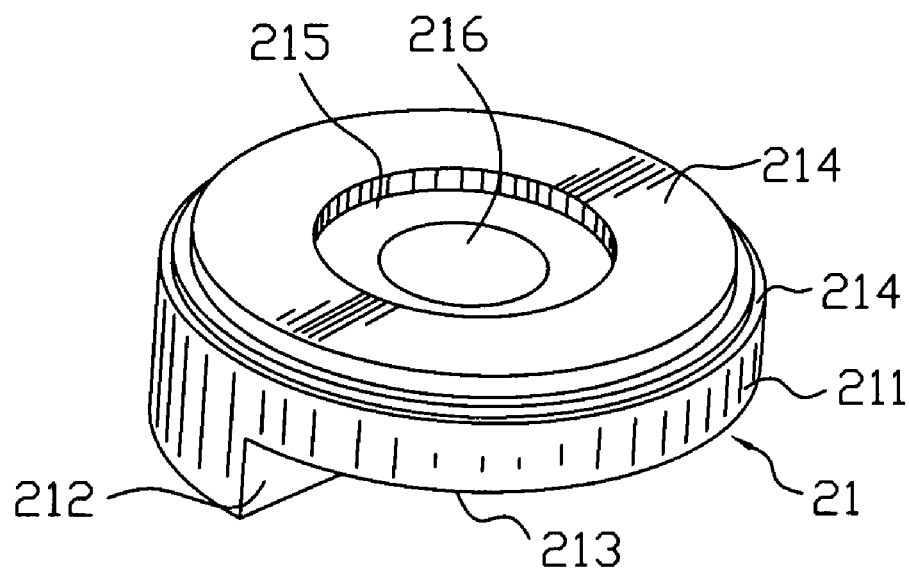
FIG. 6 is a perspective view of a first stop of the hinge.

With reference to FIG. 6, the first stop 21 of the damper assembly 2 is substantially column-shaped. The first stop 21 has a cylindrical portion 211. A part of a bottom surface of the cylindrical portion 211 extends downward to form a blocking portion 212. Correspondingly, the rest part of the bottom surface of the cylindrical portion 211 forms an open revolving platform 213. The top of the cylindrical portion 211 is step-like and defines three steps 214 including a top step, a middle step and a bottom step. The top step 214 defines a receiving cavity 215 at center. A run-through hole 216 is defined at the center of the receiving cavity 215 and passes through the whole cylindrical portion 211.

Figure 7:
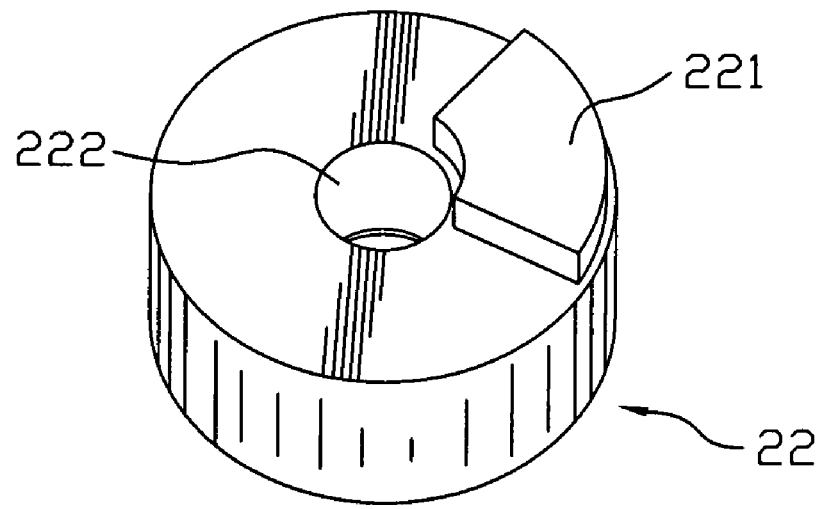
FIG. 7 is a perspective view of a second stop of the hinge.
Figure 8:
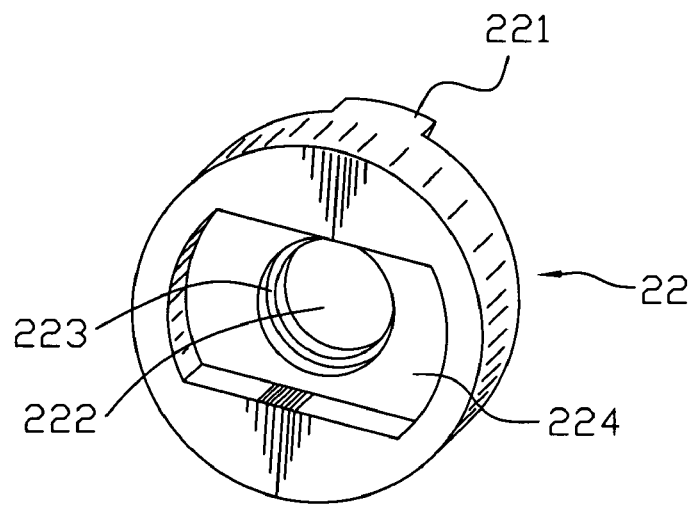
FIG. 8 is another perspective view of the second stop of the hinge.

Please refer to FIG. 7 and FIG. 8. The second stop 22 is in column shape and has a top surface and a bottom surface (not labeled). The second stop 22 defines a perforation 222 passing through the top surface and the bottom surface at center. The top surface protrudes upward to form a fan-shaped pushing block 221 which revolves around the perforation 222. The bottom surface defines a substantially rectangular mating cavity 224. An inner surface of the perforation 222 defines a slot 223 therein.

Figure 4:
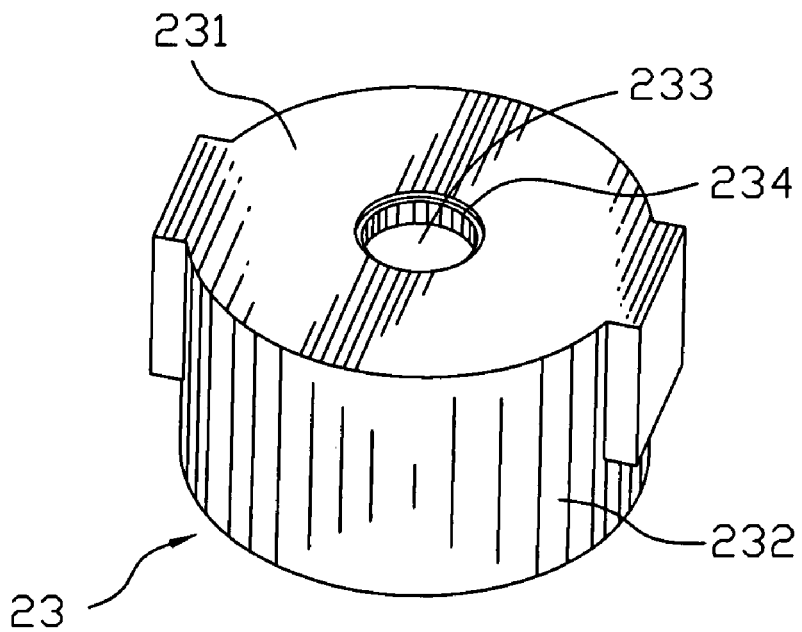
FIG. 4 is a perspective view of a cap of the hinge.
Figure 5:
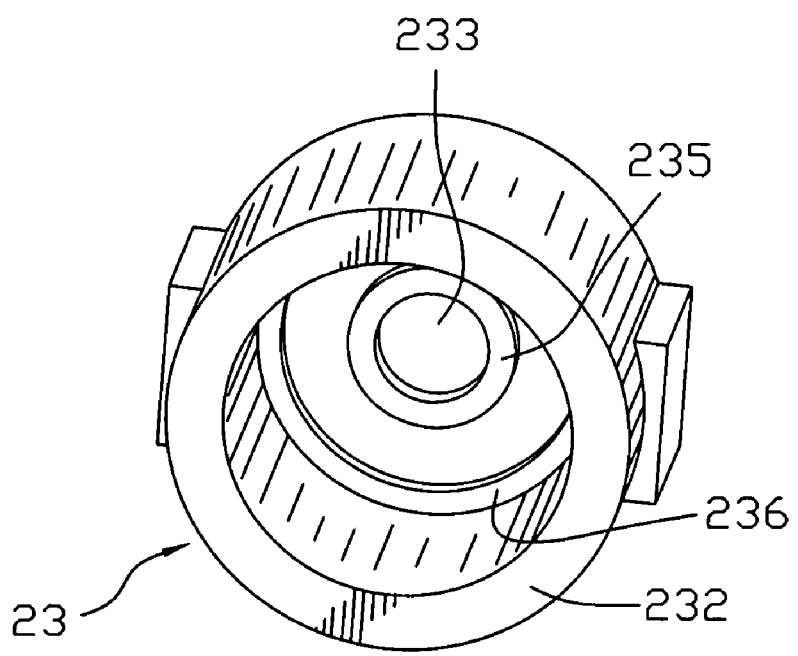
FIG. 5 is another perspective view of the cap of the hinge.

Referring to FIG. 4 and FIG. 5, the cap 23 is hollow and in substantially cylindrical shape. The cap 23 has a top wall 231. The top wall 231 extends downward to form a peripheral enclosure 232. The top wall 231 defines a receiving hole 233 passing therethrough at center. An inner surface of the receiving hole 233 protrudes inward to form a shoulder 234. A first hollow mounting portion 235 extends downward from a bottom surface of the top wall 231 and has the same axis center as the receiving hole 233. A second mounting portion 236 extends downward form the bottom surface of the top wall 231 and attaches to an inner surface of the enclosure 232. A radius of the second mounting portion 236 is greater than a radius of the first mounting portion 235.

Please refer to FIG. 3. The cylindrical rod 24 defines a head 241 and a neck 242 at a top end thereof. A bottom end of the cylindrical rod 24 protrudes outward around thereof to form a restraining portion 243.

Please refer to FIGS. 2 to 8. When the damper assembly 2 is assembled, the first stop 21 couples with the second stop 22. The pushing block 221 of the second stop 22 is disposed on the revolving platform 213 of the first stop 21. Both the first stop 21 and the second stop 22 are rotatablely received in the cap 23. Therefore the first mounting portion 235 is arranged in the receiving cavity 215 and the second mounting portion 236 is coupled with the middle step 214. The cylindrical rod 24 passes through the receiving hole 233 of the cap 23, the run-through hole 216 of the first stop 21 and the perforation 222 of the second stop 22 in turn. The restraining portion 243 defined on the bottom end of the cylindrical rod 24 is located in the slot 223 of the second stop 22. The head 241 and the neck 242 of the cylindrical rod 24 are exposed out of the cap 23. The washer 25 passes through the cylindrical rod 24 and is adjacent to the top wall 231 of the cap 23. The e-ring 26 is mounted in the neck 242 of the cylindrical rod 24 for fixedly fabricated the cylindrical rod 24 with the cap 23. In a preferred embodiment, damper oil (not shown) is provided to coat on inner surfaces of the first mounting portion 235, the second mounting portion 236, the receiving cavity 215 and surfaces of the three steps 214. In order to avoid the damper oil leaking out, the circular ring 28 that is bigger is seated on the bottom step 214 defined on the top of the cylindrical portion 211 of the first stop 21. The circular ring 27 that is smaller is placed on the shoulder 234 of the cap 23.

Please refer to FIGS. 2-3. When the hinge assembly 1 and the damper assembly 2 are integrated together, the mating portion 172 of the rotatable cam 17 is fittingly received in the mating cavity 224 of the second stop 22.

The hinge is assembled on a foldable electronic device which has a cover and a main body. The housing 13 and the cap 23 are configured on the main body and the rotatable cam 17 is configured on the cover in the preferred embodiment. When a user wants to open the foldable electronic device, the user firstly opens the cover from the main body partly. Then the force the user provides drives the rotatable cam 17 rotating. The rotatable cam 17 further drives the second stop 22 rotating. The pushing block 221 of the second stop 22 moves on the revolving platform 213 of the first stop 21 around the cylindrical rod 24. When the pushing block 221 moves to a side of the blocking portion 212 of the first stop 21 and is against the blocking portion 212, the second stop 22 drives the first stop 21 rotating. Because the damper oil is coated on the inner surfaces of the first mounting portion 235, the second mounting portion 236, the receiving cavity 215 and the surfaces of the three steps 214, the rotation rate of the first stop 21 is restrained, and therefore, the rotation rates of the second stop 22 and the rotatable cam 17 are restrained at the same time. In the process of the two pushing portions 174 of the rotatable cam 17 pushed on the ascending curved surfaces of the two concave portions 163 of the sliding cam 16 respectively, the pushing portions 174 drive the sliding cam 16 sliding toward the inner of the housing 13 and so the spring 14 is compressed. If the user stops acting on the foldable electronic device, the elastic force stored in the spring 14 drives the rotatable cam 17 rotating continually until the foldable electronic device is opened fully. Because of the restraining function of the damper assembly 2, the cover is opened from the main body smoothly.

When the cover of the foldable electronic device is moved from an open state to a close state, the user firstly closes the cover to the main body partly. Then the force the user provides drives the rotatable cam 17 rotating. The rotatable cam 17 further drives the second stop 22 rotating. The pushing block 221 of the second stop 22 moves on the revolving platform 213 of the first stop 21 around the cylindrical rod 24. When the pushing block 221 moves to an opposite side of the blocking portion 212 of the first stop 21 and is against the blocking portion 212, the second stop 22 drives the first stop 21 rotating. Because the damper oil is coated on the inner surfaces of the first mounting portion 235, the second mounting portion 236, the receiving cavity 215 and the surfaces of the three steps 214, the rotation rate of the first stop 21 is restrained, and therefore, the rotation rates of the second stop 22 and the rotatable cam 17 are restrained at the same time. Then the two pushing portions 174 of the rotatable cam 17 are pushed on the ascending curved surfaces of the two concave portions 163 of the sliding cam 16 respectively. The pushing portions 174 drive the sliding cam 16 sliding toward the inner of the housing 13 and so the spring 14 is compressed. If the user stops acting on the foldable electronic device, the elastic force stored in the spring 14 drives the rotatable cam 17 rotating continually until the foldable electronic device is closed fully. Because of the restraining function of the damper assembly 2, the cover is closed to the main body smoothly.

As described above, the design of the present invention provides a damper assembly 2 to restrain the rotation rate of the rotatable cam 17. Therefore, the foldable electronic device with the hinge can be opened or closed much more securely.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:
1. A hinge, comprising:
a housing;
a sliding cam, slidably received in the housing, defining concave portions on a top surface thereof, the sliding cam defining an axial hole passing therethrough at center;
a rotatable cam, mating with the sliding cam, having a base portion which extends downward to form pushing portions, the pushing portions disposed in the concave portions of the sliding cam respectively, the base portion defining an accommodating hole passing therethrough at center;
a spring, slidably received in the housing, one end of the spring fixed on the sliding cam, and the other end of the spring fixed at an end of the housing;
a shaft, received in the housing, running through the axial hole of the sliding cam and the spring, an end of the shaft received in the accommodating hole of the rotatable cam, and the other end of the shaft passing through the end of the housing;
a first stop, having a bottom surface, a part of the bottom surface extending downward to form a blocking portion, a remaining part of the bottom surface defined as a revolving platform, the first stop defines steps including a top step, a bottom step and a middle step disposed between the top step and the bottom step on a top surface thereof, the top step having the receiving cavity formed on a center portion of a top surface thereof;
a second stop, rotatably engaging with the rotatable cam at the bottom thereof, having a top surface, the top surface protruding upward to form a pushing block disposed on the revolving platform of the first stop, the pushing block moving to a side of the blocking portion of the first stop and against the blocking portion for driving the first stop rotating; and
a cap having a top wall and rotatably receiving the first stop and the second stop, a first mounting portion extending downwardly from a center portion of a bottom surface of the top wall, the first mounting portion being rotatably received in the receiving cavity, the top wall of the care extending downwardly to form a peripheral enclosure, a second mounting portion extending downwardly from the bottom surface of the top wall attaches to an inner surface of the enclosure, the second mounting portion being seated on the middle step.

2. The hinge as claimed in claim 1, wherein the first stop defines a run-through hole passing therethrough at center, the second stop defines a perforation passing therethrough at center, the perforation defines a slot in an inner surface thereof, the cap defines a receiving hole passing therethrough at center, the receiving hole protrudes inward to form a shoulder from an inner surface thereof, the run-through hole, the perforation and the receiving hole have the same axis center.

3. The hinge as claimed in claim 2, further comprising a rod running through the cap, the first stop, and the second stop and received in the receiving hole, the run-through hole and the perforation.

4. The hinge as claimed in claim 3, wherein the rod defines a restraining portion at a bottom end thereof, the restraining portion is locked in the slot defined in the inner surface of the perforation.

5. The hinge as claimed in claim 3, wherein the rod defines a head and a neck at a top end thereof, the head and the neck run through the receiving hole and expose out of the cap, a washer passes through the head and the neck and is adjacent to the top wall of the cap, an e-ring is mounted in the neck for fixedly fabricating the rod with the cap.

6. The hinge as claimed in claim 2, further comprising two rings, one ring that is bigger seated on the bottom step defined on the first stop, and the other ring placed on the shoulder of the cap.

7. The hinge as claimed in claim 1, further comprising damper oil filled between the first stop and the cap.

8. The hinge as claimed in claim 1, wherein the base portion of the rotatable cam protrudes upward to form a mating portion at a top surface thereof, the second stop defines a mating cavity at bottom to engage with the mating portion.

9. The hinge as claimed in claim 1, further comprising a stopple stopping the end of the housing, one end of the spring fastened around the stopple that protrudes in the housing, the shaft passing through the end of the housing and the stopple to be located on the stopple by a limiting ring.

10. The hinge as claimed in claim 1, wherein the accommodating hole of the rotatable cam defines a locking recess in an inner surface thereof, the end of the shaft received in the accommodating hole protrudes outward around thereof to form a protrusion portion, the protrusion portion is located in the locking recess.

* * * * *